Aug. 20, 1946.   J. JANY   2,406,148
ARRANGEMENT FOR THE DISTANT VIEWING OF RADIOSCOPIC IMAGES
Filed July 17, 1943   3 Sheets-Sheet 1
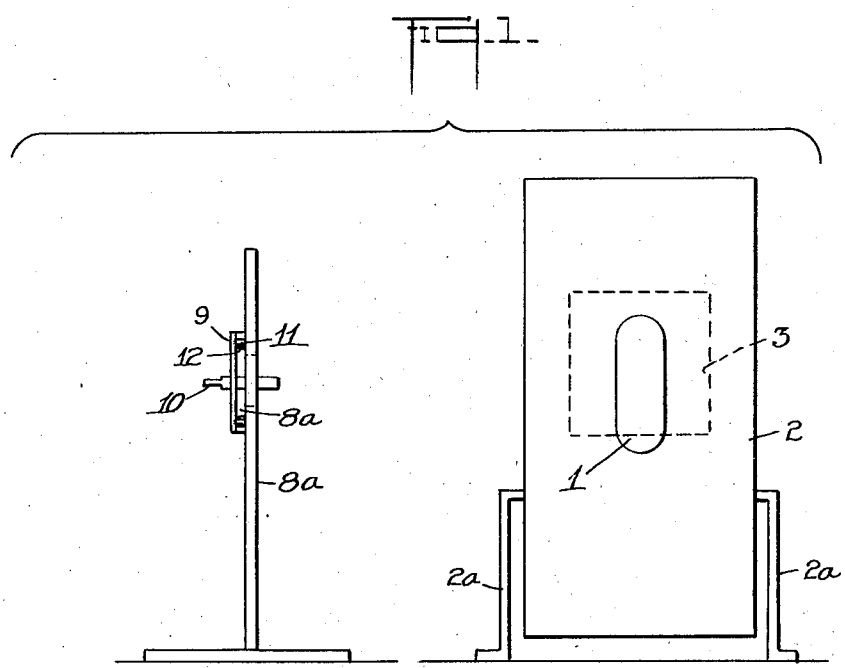
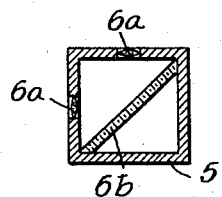
JOSE JANY
INVENTOR
BY
his ATTORNEY.

Aug. 20, 1946.  J. JANY  2,406,148
ARRANGEMENT FOR THE DISTANT VIEWING OF RADIOSCOPIC IMAGES
Filed July 17, 1943  3 Sheets-Sheet 2
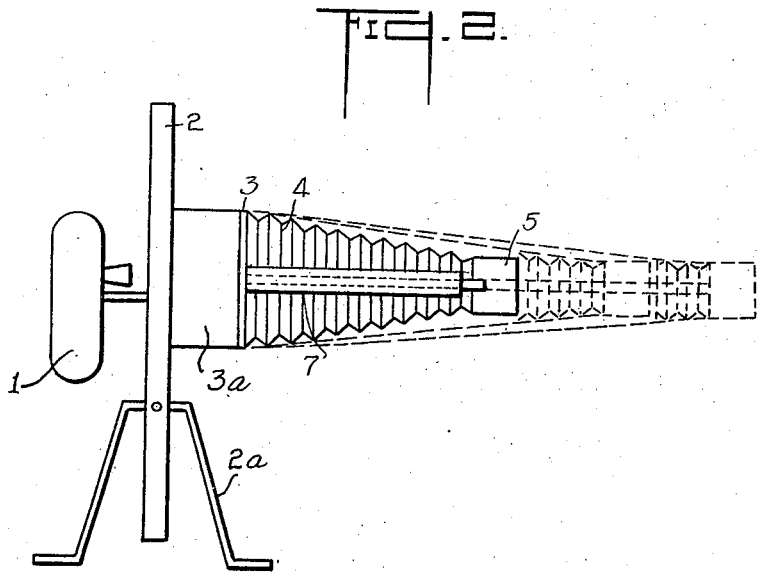
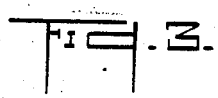
José Jany
INVENTOR
BY
his ATTORNEY.

Patented Aug. 20, 1946

2,406,148

UNITED STATES PATENT OFFICE 2,406,148

ARRANGEMENT FOR THE DISTANT VIEWING OF RADIOSCOPIC IMAGES

José Jany, Sao Paulo, Brazil

Application July 17, 1943, Serial No. 495,203
In Brazil June 14, 1943

2 Claims. (Cl. 250—77)

The present invention relates to an arrangement for the distant viewing of radioscopic images.

One object of the invention is to provide an arrangement for the distant viewing of radioscopic images in which the operator is protected by a lead shielded screen against the action of the direct or secondary X-rays.

Another object of the invention is to provide a device for the distant viewing of radioscopic images in which the observer may be stationed in an undarkened room so that the time period otherwise necessary for the adaptation of the eyes of the observer to the dark room is eliminated, and the observation of the position of the patient and all his movements is facilitated.

Still another object of the invention is to provide an arrangement for the distant viewing of radioscopic images, obtained on a fluorescent screen, from a patient placed in contact with a radiologic table regardless of whether such table and fluorescent screen are placed in a horizontal position or in a vertical position.

A still further object of the invention is to provide an arrangement which permits of modifying the size of the field of radioscopic vision on the fluorescent screen in accordance with the magnitude of the desired enlargement, depending upon the organ of the patient to be observed and diagnosed.

These and other objects, which will appear more clearly as the specification proceeds, are accomplished according to the present invention by the arrangement and combination of elements set forth in the following detailed description, defined in the appended claims and illustratively exemplified by the accompanying drawings in which, Fig. 1 is an end view of the arrangement according to the invention with the radiologic table and fluorescent screen in a vertical position.

Figs. 2 and 3 are separate side views respectively of the X-ray equipment including the radiologic table, X-ray tube, the fluorescent screen and a mirror box connected to the fluorescent screen by means of a bellows; and of the protective wall in which part of the viewing equipment is slidably supported.

Fig. 4 is a vertical axial section of the mirror box showing its internal construction.

Figure 5:
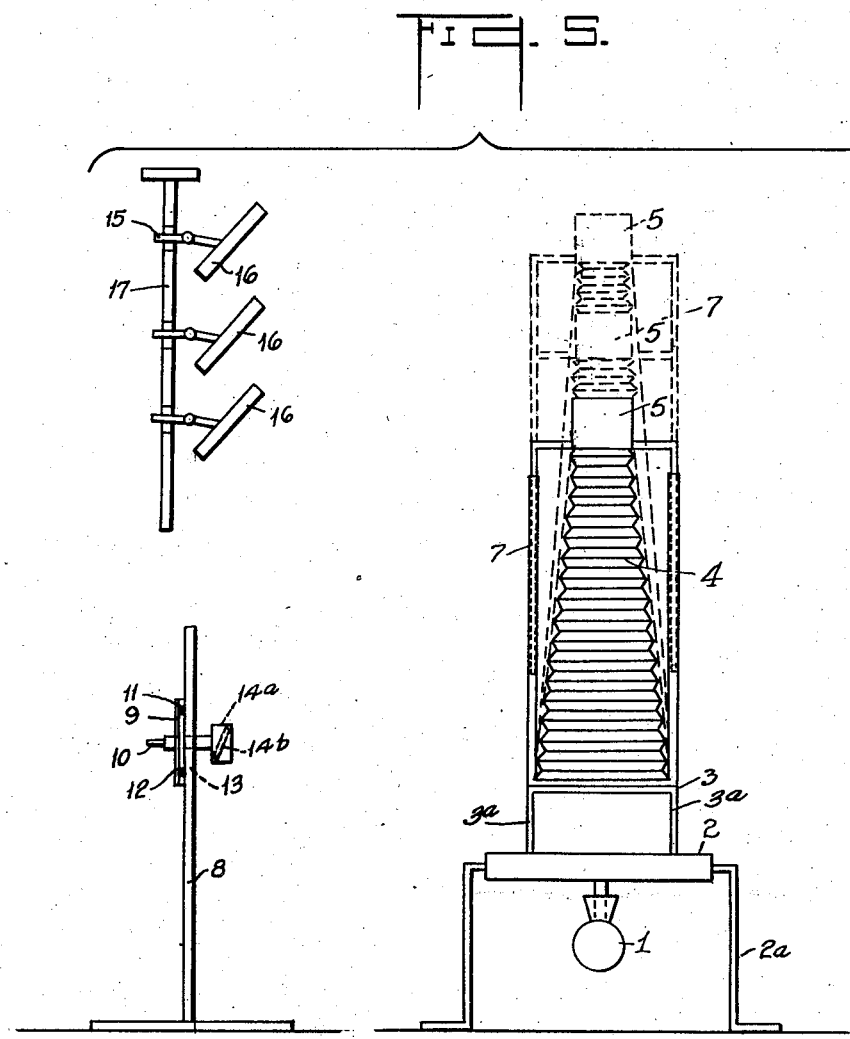
Fig. 5 is an end view similar to that of Fig. 1, but showing the radiologic table and fluorescent screen in horizontal position and also including a series of mirrors and a pick-up device for transmitting rays coming from the mirror box to the viewing equipment.

Referring now to the drawings, and first to Figs. 1 to 4, 1 is an X-ray tube mounted on the rear of the radiologic table 2, which latter is pivoted in a frame 2a and in Figs. 1 to 4 is adjusted to a vertical position. A fluorescent screen 3 is mounted at a distance in front and parallel to the radiologic table 2 and connected with the latter by lateral brackets 3a. A telescopic frame 7 extends forwardly from the fluorescent screen 3 at substantially right angles to the latter and supports an expanding bellows 4. A mirror box 5 is mounted on the front end of the bellows 4 and contains two lenses 6a disposed at right angles to one another and a mirror 6b disposed at an angle of 45° to the optical axis of the device so as to deflect light rays entering the box 5 through one of the lenses 6a at an angle of 90°, whereupon said light rays are emitted through the second lens 6a.

The entire X-ray equipment, including the radiologic table, the X-ray tube, the fluorescent screen, the telescope frame, the bellows and the mirror box may be tilted in the frame 2a and adjusted either to a position in which the radiologic table and fluorescent screen extend in vertical planes and the telescope frame and bellows project horizontally (see Figs. 1 and 2), or to a position in which the radiologic table and fluorescent screen are disposed in horizontal planes and the telescope frame and bellows project vertically upwardly from the fluorescent screen (see Fig. 5).

The telescope frame and bellows may be extended to various lengths, the least extended position being shown in full lines in Figs. 2 and 5, each of which shows two further extended positions in broken lines.

8 is an upright lead sheet covered partition wall disposed in a plane parallel to the optical axis of the X-ray equipment and provided with a horizontal slot 13, the longitudinal edges of which are equidistantly spaced from the horizontal plane containing the optical axis of the X-ray apparatus when the latter assumes the position in which its optical axis extends horizontal (see Figs. 1, 2 and 3). A carriage 9 consisting substantially of a lead sheet covered protective plate is mounted by means of wheels 11 slidably along the slot 13 on rails 12 extending along the edges of the slot 13. A telescope 10 projects through the carriage plate 9 with its optical axis disposed at right angles to the horizontal optical axis of the X-ray apparatus and in the same horizontal plane as the latter.

In order to operate the arrangement with the radiologic table in the vertical position (Figs. 1 to 3), the bellows 4 is extended in accordance with the size of the field which the operator desires to observe. The carriage 9 is then moved along the rail 12 in the screening wall 8 to bring the optical axis of the telescope 10 in exact alignment with that lens 6a of the mirror box 5 from which the deflected rays emerge. The telescope 10 is properly focused and the radioscopic image produced by the X-ray equipment on the fluorescent screen 3 may be observed without any danger of the observer being exposed to the detrimental effects of primary or secondary X-rays.

Fig. 5 shows certain additional elements to be used when the X-ray apparatus is positioned to have the radiologic table 2 and fluorescent screen 3 disposed in horizontal planes. A vertical rod 17 depends from the roof of the laboratory and carries a number of equidistantly spaced brackets 15, each of which supports an adjustable mirror 16. The mirrors 16 are so arranged that, at different extensions of the bellows 4, the rays emerging from the mirror box 5 through one of the lenses 6a will strike one or the other of the mirror surfaces 16. Each mirror 16 may be set at various inclined positions to deflect the rays striking its surfaces in a downward direction. An optical pick-up device 14 containing a lens 14a and an inclined mirror 14b is, in this case, attached to the objective end of the telescope to receive the light rays reflected by the mirror 16 and to deflect such rays into the telescope 10. In the position shown in Fig. 5, the arrangement is operated as follows: The extension of the bellows is properly determined and fixed. The pick-up 14 is attached to the telescope. The mirrors 16 are adjusted to the proper angles to deflect the light rays emerging from the mirror box 5 downwardly in the direction of the pick-up 14. The supporting carriage 9 is moved along the rails 12 to the proper position. The pick-up 14 is turned to align the axis of its lens 14a with the optical axis of the beam reflected from the proper mirror 16; finally the telescope 10 is focused and the radioscopic observation may thus proceed in the same manner as described above from the outside of the wall 8 through the telescope 10.

I claim:

1. An arrangement for the distant viewing of radioscopic images comprising in combination with an X-ray apparatus including an X-ray tube, a radiological table, a fluorescent screen and a bellows having one end thereof attached to said fluorescent screen and being extensible along the optical axis of said X-ray apparatus, the latter being capable of assuming a position in which its optical axis is disposed in a horizontal plane, an upright lead sheet covered partition wall disposed in a plane parallel to the optical axis of said X-ray apparatus and provided with a horizontal slot the longitudinal edges of which are equidistantly spaced from said horizontal plane containing the optical axis of said X-ray apparatus, a lead sheet protected carriage slidable lengthwise of said slot, a telescope supported by said carriage with its optical axis disposed in said horizontal plane at right angles to said partition wall, and an optical device mounted at the other end of said bellows to divert the light rays passing from said luminous screen along said optical axis of said X-ray apparatus through said bellows at right angles towards said partition wall.

2. An arrangement, as claimed in claim 1, in which said X-ray apparatus is adjustable to a position in which its optical axis extends vertically, a series of mirrors disposed to receive light rays emitted from said optical device in several predetermined extended positions of said bellows along said vertically disposed axis, respectively, said mirrors being adjustable to various inclined positions, and means attachable to said telescope for picking up an image reflected from any of said mirrors and diverting it into said telescope.

JOSÉ JANY.